US007016094B2

(12) United States Patent
Awaya et al.

(10) Patent No.: US 7,016,094 B2
(45) Date of Patent: Mar. 21, 2006

(54) NONVOLATILE SOLID STATE ELECTRO-OPTIC MODULATOR

(75) Inventors: Nobuyoshi Awaya, Hiroshima Pref. (JP); David R. Evans, Beaverton, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 10/755,637

(22) Filed: Jan. 12, 2004

(65) Prior Publication Data

US 2005/0152024 A1 Jul. 14, 2005

(51) Int. Cl.
*G02F 1/03* (2006.01)
*G02F 1/00* (2006.01)
*G02F 1/035* (2006.01)
*G02F 1/295* (2006.01)

(52) U.S. Cl. ...................... 359/245; 359/254; 359/321; 359/322; 359/324; 385/2; 385/8

(58) Field of Classification Search ................ 359/245, 359/248, 252, 254, 255, 321, 322, 324, 291; 385/2, 8; 360/112; 419/2
See application file for complete search history.

(56) References Cited

U.S. PATENT DOCUMENTS

| | | | | |
|---|---|---|---|---|
| 3,874,782 | A | | 4/1975 | Schmidt |
| 3,923,374 | A | | 12/1975 | Martin |
| 4,932,738 | A | | 6/1990 | Haas et al. |
| 4,936,644 | A | | 6/1990 | Raskin et al. |
| 5,936,690 | A | | 8/1999 | Koden et al. |
| 5,937,264 | A | * | 8/1999 | Wallin ........................... 419/2 |
| 6,069,729 | A | | 5/2000 | Gill et al. |
| 6,204,139 | B1 | | 3/2001 | Liu et al. |
| 6,473,332 | B1 | | 10/2002 | Ignatiev et al. |
| 6,558,759 | B1 | | 5/2003 | Chandrasekhar et al. |
| 6,650,461 | B1 | * | 11/2003 | Atobe et al. ................ 359/291 |
| 6,791,792 | B1 | * | 9/2004 | Takahashi .................. 360/112 |

OTHER PUBLICATIONS

E.L. Wooten, K.M. Kissa, A. Yi-Yan, A.J. Murphy, D.A. Lafaw, P.F. Hallemeier, D. Maack, D.V. Attanasio, D.J. Fritz, G.J. McBrien, D.E. Bossi, "*A review of lithium niobate modulators for fiber-optic communication systems*", IEEE Journal of Selected Topics in Quantum Electronics, vol. 6, No. 1, Jan/Feb 2000, p. 69-82.

Alumni Club of Ece, ECE Entrepreneurs II, "Electro-optic Effect", Faculty Club, UCSD, Jun. 4, 2002.

(Continued)

*Primary Examiner*—Georgia Epps
*Assistant Examiner*—Jack Dinh
(74) *Attorney, Agent, or Firm*—David C. Ripma

(57) ABSTRACT

Perovskite materials having magnetoresistive effect under the influence of an electric field can be employed in the construction of nonvolatile solid state electro-optic modulator. These materials display nonvolatile changes in electrical resistance and reactant when subjected to an electric field. As with other known perovskite materials, this is accompanied by nonvolatile changes in electro-optic properties related to dispersion and absorption of electromagnetic radiation. The nonvolatility of these materials is exploited in the construction of nonvolatile display and nonvolatile solid state electro-optic modulators such as waveguide switch or phase or amplitude modulators.

12 Claims, 8 Drawing Sheets

OTHER PUBLICATIONS

S. Kiele, M.V. Zimmermann, D. Casa, B. Buchner, "Hint for a photo-induced charge order transition in single layer manganites", Abstract No. kiel0369.

E. Dagotto, "*Nanoscale Phase Separation and Colossal Magnetoresistance, The Physics of Manganites and Related Compounds*", Series: Springer Series in Solid-State Sciences, vol. 136. Chapter 12: Optical Conductivity.

Application Note 2, "Practical uses and applications of electro-optic modulators", New Fous, Smart Optics for Network, 5215 Hellyer Ave., San Jose, CA 95138.

* cited by examiner

NONVOLATILE SOLID STATE ELECTRO-OPTIC MODULATOR

FIELD OF THE INVENTION

The present invention relates to a nonvolatile medium in electro-optic applications. More specifically, it relates to nonvolatile display and nonvolatile electro-optic modulators.

BACKGROUND OF THE INVENTION

Microelectronic devices can be classified to volatile and nonvolatile devices based on their power characteristics. In volatile devices, the device's states are supported by the electrical power, and the device behaves as expected as long as the circuit receives power. In contrast, in nonvolatile devices, the device's states are stable with or without the applied power, and therefore when the power is off, the device stays in their states without any changes.

The major difference between a volatile and a nonvolatile device is the fundamental designed states of the device. If the device states are stable without any power source, the device is nonvolatile. If the device states require power to maintain, the device is volatile. Nonvolatility is much more desirable than volatility due to the lower power consumption, and the ability to remember and retain information without external power sources.

An example of volatility and nonvolatility is memory devices. A DRAM (dynamic random access memory) is a volatile memory device because the DRAM states are represented by a collection of charges, stored in a capacitor. Because of the inherent leakage of the capacitor charge, the DRAM state where the capacitor is charged is not stable without power. Thus by designing the electron charges as the memory state, the DRAM memory cell is inherently a volatile device. A RRAM (resistive random access memory) is a nonvolatile memory, employing a class of memory materials that have electrical resistance characteristics changeable by external influences. The RRAM memory is represented by the multistable states of high resistance and low resistance, where the applied power is only needed to switch the states and not to maintain them. The examples of such memory materials are perovskite materials exhibiting magnetoresistive effect or high temperature superconducting effect, disclosed in U.S. Pat. No. 6,204,139 of Liu et al., and U.S. Pat. No. 6,473,332 of Ignatiev et al., hereby incorporated by reference.

Another example of volatile device is electro-optic systems for high speed optical data transfer and processing, using electric fields to control the propagation of light through their optical materials. Common electro-optic systems are currently based on devices fabricated in bulk $LiNbO_3$ crystals which have proven maturity and long term stability. The design and selection of current electro-optic media such as $LiNbO_3$ lead to the inevitable feature of volatility, since the current electro-optic media require the presence of electric field to maintain their optical states.

The present invention addresses the nonvolatility of the electro-optic properties in the field of light transmission. The first step in designing nonvolatile electro-optic device is to identify multistable states and multistable medium for optical applications.

SUMMARY OF THE INVENTION

The present invention discloses a nonvolatile solid state electro-optic medium which is a perovskite material having magnetoresistive effect under the influence of an electric field.

Perovskite materials having magnetoresistive effect under the influence of an electric field display nonvolatile changes in electrical resistance and reactant when subjected to an electric field. This effect has been used in the design and construction of nonvolatile RRAM. As with other known perovskite materials, this is expected to be accompanied by nonvolatile changes in electro-optic properties related to dispersion and absorption of electromagnetic radiation. The nonvolatile optical properties of these materials is exploited in the present invention for the construction of nonvolatile display and nonvolatile solid state electro-optic modulators such as waveguide switch or phase or amplitude modulators.

The first embodiment of the present invention nonvolatile electro-optic medium is a nonvolatile display cell. Since the absorption property of the perovskite material changes nonvolatily under the influence of an electric field, using the perovskite material as a display medium will allow the construction of a nonvolatile display. The applied electric field is only needed to switch state to change the absorption property of the perovskite medium and therefore change the lightness of the display cell. This reduces power consumption, and display flickering, especially for the displays with un-frequent updates.

The second embodiment of the present invention nonvolatile electro-optic medium is a nonvolatile electro-optic modulator. Since the index of refraction of the perovskite material changes nonvolatily under the influence of an electric field, using the perovskite material as an electro-optic medium will allow the construction of nonvolatile phase modulators, amplitude modulators, frequency modulators or optical switches. By design, the applied electric field is only needed to switch state to change the dispersion property of the perovskite medium.

DETAILED DESCRIPTION OF THE INVENTION

Figure 1A:
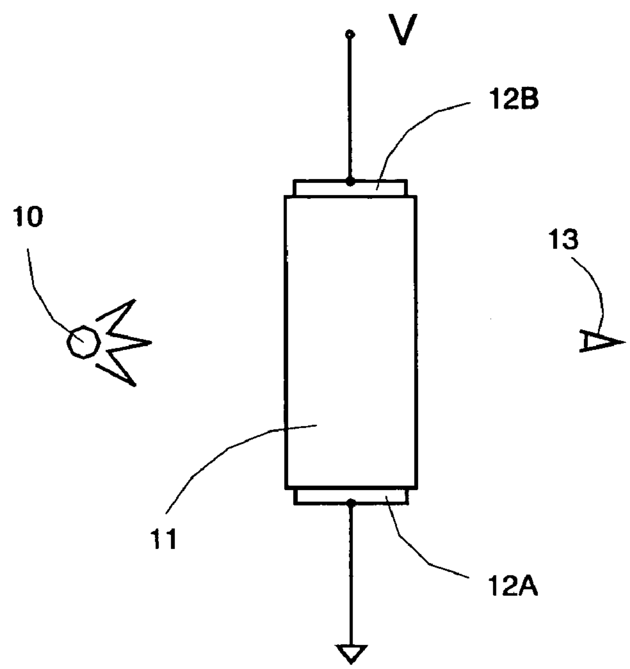
FIG. 1A show the schematic of the present invention nonvolatile electro-optic light transmission with the electrodes positioned parallel to the light path.

Nonvolatility is a desired feature of the device properties mainly due to the ability to maintain the state or the information without the need for power. A nonvolatile memory device, such as a hard drive or an EEPROM, can retain the information even in the absence of power. In contrast, a volatile memory device, such as DRAM, loses the information without power. A nonvolatile device thus can go to sleep when the power is off, and when the power is restored, wakes up and is ready at the same state before the power interruption. Therefore the absence of power only delays the nonvolatile device, not terminates it.

Nonvolatility is a design issue, achievable when the multiple states of the device are stable states without the need of external power. The design of nonvolatility occurs in the very beginning of the device concept, and once the concept is formed, little can be done to change the volatility or nonvolatility feature of the designed device. For example, by using a collection of electron charges to represent a memory state, this design is volatile since the charge accumulation rapidly disperses in the absence of power. Thus the volatility feature of this device is almost impossible to change. In contrast, by using multistable states of resistance in a perovskite material to represent different memory states, this design is nonvolatile since once the perovskite material is set into a resistance state, it remains there until an external influence (in this case an external electric field) moves the perovskite material into another stable resistance state. And therefore the nonvolatility of this design is assured.

This invention discloses the nonvolatile design concept and devices for electro-optic transmission using perovskite material having magnetoresistive effect under the influence of an electric field as the transmission medium.

Materials having perovskite structure such as magnetoresistive (MR) materials, giant magnetoresistive (GMR) materials, colossal magnetoresistive (CMR) materials, or high temperature superconductivity (HTSC) materials can store information by the their stable magnetoresistance state, which can be changed by an external magnetic or electric field, and the information can be read by magnetoresistive sensing of such state. HTSC materials such as $PbZr_xTi_{1-x}O_3$, YBCO (Yttrium Barium Copper Oxide, $YBa_2Cu_3O_7$ and its variants), have their main use as a superconductor, but since their conductivity can be affected by an electrical current or a magnetic field, these HTSC materials can also be used as variable resistors in nonvolatile memory cells.

Typical perovskite materials having magnetoresistive effect are the manganite perovskite materials of the $Re_{1-x}Ae_xMnO_3$ structure (Re: rare earth elements, Ae: alkaline earth elements) such as $Pr_{0.7}Ca_{0.3}MnO_3$ (PCMO), $La_{0.7}Ca_{0.3}MnO_3$ (LCMO), $Nd_{0.7}Sr_{0.3}MnO_3$ (NSMO). The rare earth elements are La, Ce, Pr, Nd, Pm, Sm, Eu, Gd, Tb, Dy, Ho, Er, Tm, Yb, and Lu. The alkaline earth metals are Be, Mg, Ca, Sr, Ba, and Ra. Suitable perovskite materials for the present invention include magnetoresistive materials and HTSC materials such as PrCaMnO (PCMO), LaCaMnO (LCMO), LaSrMnO (LSMO), LaBaMnO (LBMO), LaPbMnO (LPMO), NdCaMnO (NCMO), NdSrMnO (NSMO), NdPbMnO (NPMO), LaPrCaMnO (LPCMO), and GdBaCoO (GBCO).

The nonvolatile resistance changes in the perovskite materials is a result of a wide diversity of stable ground states, occurring by an active number of degrees of freedom such as spin, charge, lattice and orbital. The ground state is then determined by the interactions of the competing relevant degrees of freedom. The resistance change of perovskite materials can be achieved not only by a magnetic or an electric field, but also by synchrotron x-ray illumination at low temperature. This change is accompanied by significant change in the lattice structure of the perovskite material.

Optical conductivity of perovskite materials such as PCMO has been studied, and the results indicate that the optical conductivity varies significantly with changes in compositions, temperatures and applied magnetic field. From the available data, the dependency of the optical properties such as optical conductivity and optical dispersion of the perovskite materials on the electrical field is expected, and similar to the nonvolatility of the resistance change of the perovskite materials, the changes in optical dispersion and absorption of electromagnetic radiation are also expected to be nonvolatile. This is the basic for the design of the present invention nonvolatile medium for electro-optic devices.

The present invention thus discloses a nonvolatile solid state electro-optic medium which is a perovskite material having magnetoresistive effect under the influence of an electric field with applications in nonvolatile displays and nonvolatile electro-optic modulators.

Figure 1B:
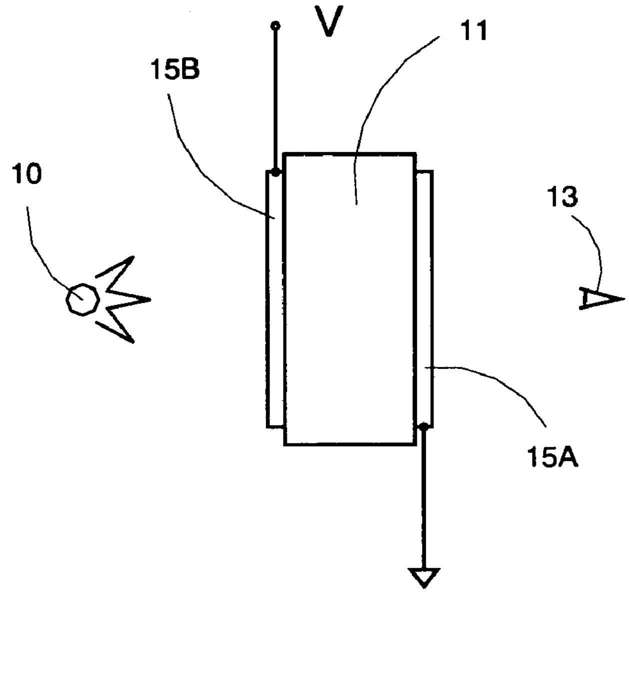
FIG. 1B shows a variation of the schematic of the present invention nonvolatile electro-optic light transmission with the electrodes positioned perpendicular to the light path.
Figure 1C:
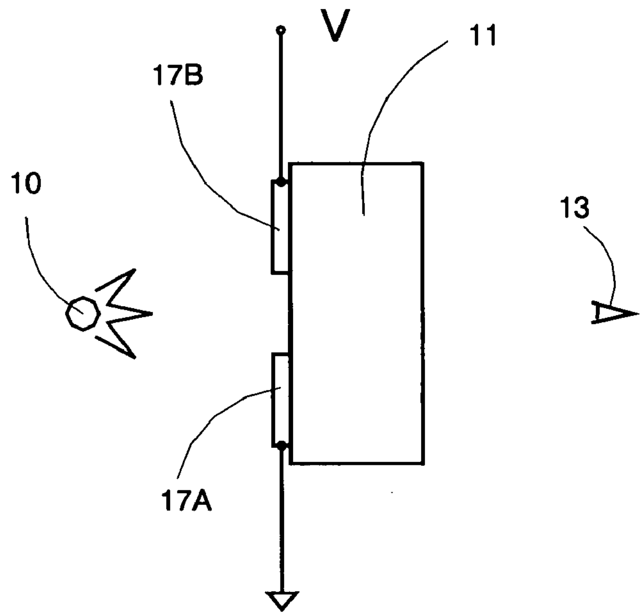
FIG. 1C shows another design variation.

The first embodiment of the present invention is an electro-optic light transmission. The word "light" used in the present context is to be understood in the broad sense and not limited to the visible spectrum, but to mean an electromagnetic radiation, preferably with frequency ranging from microwave (gigahertz) to beyond x-ray. The electro-optic light transmission comprises an electro-optic medium made of perovskite material exhibited magnetoresistance under the influence of an electric field, and a pair of electrodes to establish an electric field to control the optical properties of the electro-optic medium. Various designs can be achieved depending on the relative location of the electrodes with respect to the light source. FIG. 1A shows a design in which the electrodes positioned parallel to the light path. The light source 10 is positioned in front of the electro-optic medium 11 of the perovskite material whose optical properties are influenced by an electric field applied by the electrodes 12A and 12B. Depending on the optical conductivity of the medium 11, the light from the light source 10 may or may not reach the viewer 13, resulting in a light or dark picture elements (pixel). FIG. 1B shows a design variation with the electrodes 15A and 15B positioned perpendicular to the light path. In this design, the electrodes are transparent with respect to the light input to not interfere with the light transmission. Typical transparent and conductive material is indium tin oxide, which is used extensively in the fabrication of liquid crystal display, but other transparent, conductive materials can be used. FIG. 1C shows another design variation with the electrodes 17A and 17B positioned perpendicular to the light path, but not quite in the light path. The electrodes 17A and 17B influence the perovskite medium between the electrodes and vary the light transmission from the light source 10 to the viewer 13.

The disclosed electro-optic light transmission device is nonvolatile due to the expected nonvolatility of the optical properties of the perovskite medium, therefore the electric field applied to the electrodes is needed only for switching, and not for maintain the optical states. The power necessary for display and modulation of optical signals can be significantly reduced with this invention.

The above disclosed electro-optic light transmission device can be applied to the design of nonvolatile displays. The disclosed displays use the electro-optic medium made of perovskite materials, but otherwise similar to the construction of standard volatile liquid crystal displays (LCD) or electroluminescent (EL) devices.

Figure 2:
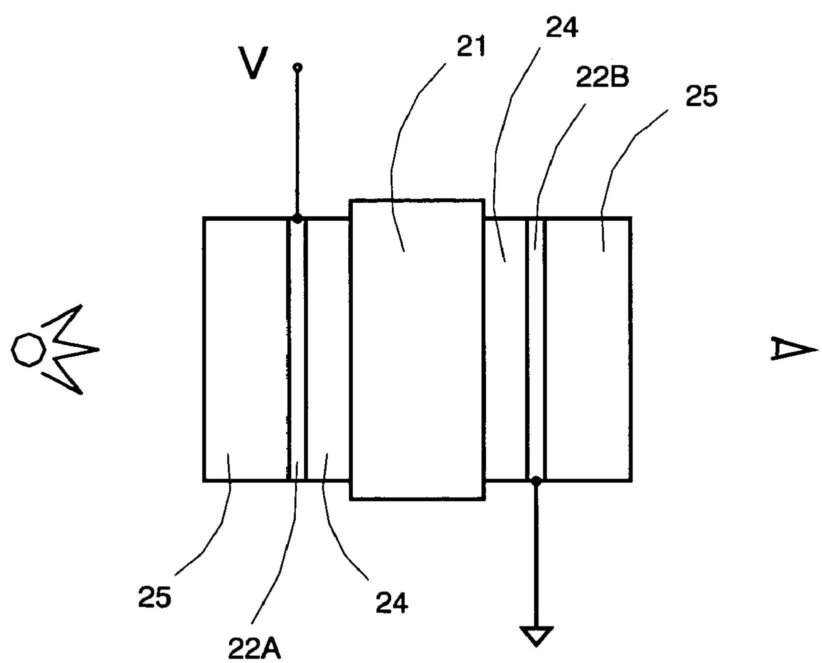
FIG. 2 shows an embodiment of the present invention nonvolatile display.

FIG. 2 shows an embodiment of the disclosed display, comprising a electro-optic medium 21 made of perovskite materials, sandwiched between two electrodes 22A and 22B, and supported by a pair of glass plate supports 25. The electric field or potential difference is applied between the two electrodes 22A and 22B which are made of conductive material. Depending on the design and construction of the display, the electrodes may have to be a transparent and electrically conductive material. By interposing the electro-optic medium 21 between a pair of polarizers 24 (an optical polarizer and an optical detector), selective switching of display between a bright state and a dark state can be realized.

For a prior art LCD display, the applied electrical potential is periodic and causes a change in the birefringence of the electro-optic medium when the potential or signal is present. This change in the birefringence varies the polarization state of light passing through the electro-optic medium, and in combination with fixed polarizers can be used to generate a visual contrast between adjacent pixels. The visual contrast of the LCD medium exists as long as the electric field is present, and the medium (all pixels) relax to the ground state when the power is removed. For a prior art EL display, the applied potential is also periodic and causes emission of light from the electro-optic medium. Similar to a LCD, this light emission is volatile, meaning that it persist as long as the power is applied.

For the present invention display, the electro-optic medium is a perovskite material that changes the optical properties when an appropriate electric field or potential is applied, similar to the prior art LCD or EL displays. However, in contrast to LCD, EL, or other electro-optic displays, these optical changes are expected to persist after the electric field or potential is removed. Hence, no additional power is required to maintain the preferred state of the electro-optic medium and the device is nonvolatile.

Figure 3:
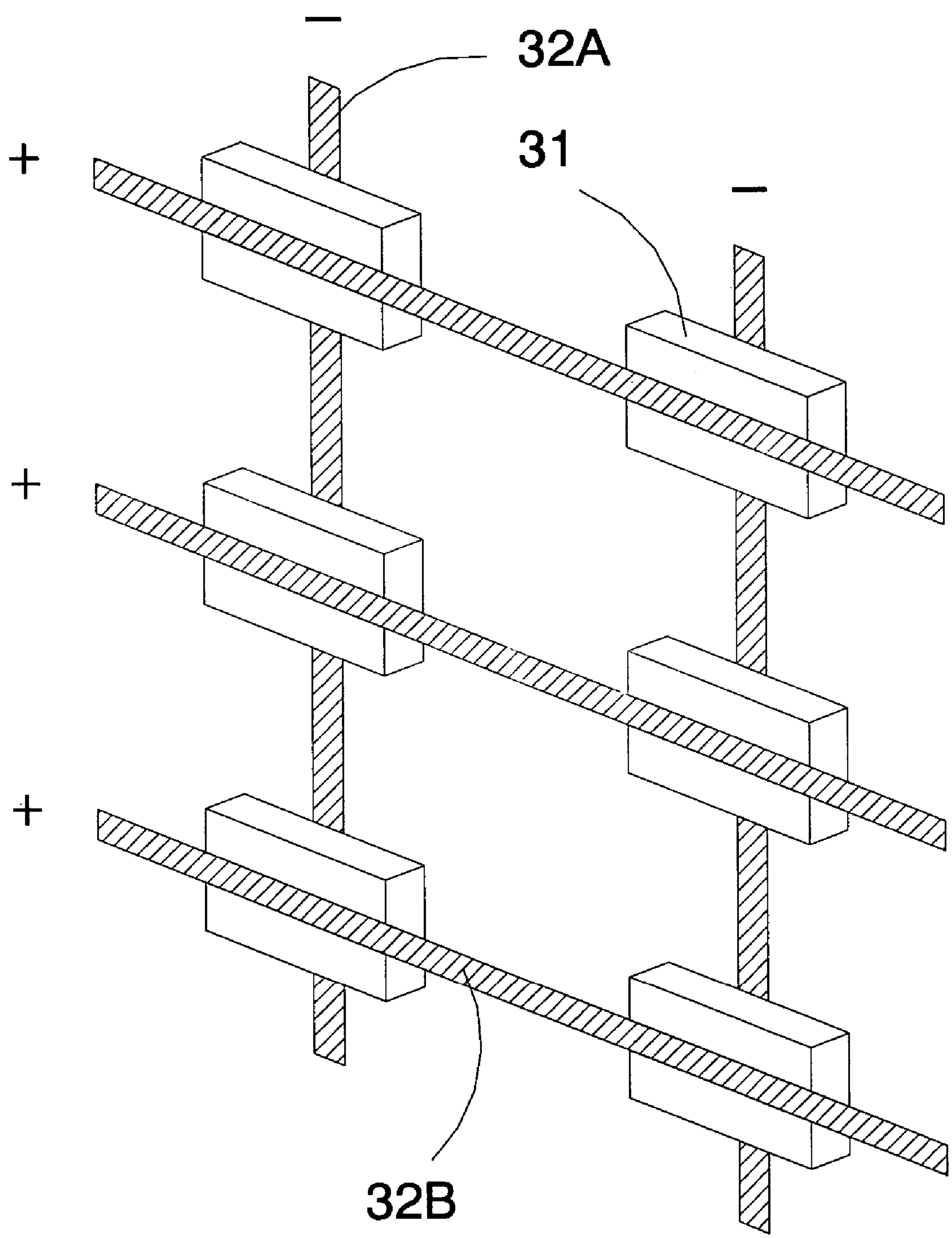
FIG. 3 shows the present invention nonvolatile cross bar display.

FIG. 3 shows a cross bar display comprising an array of cross bar electrodes 32A and 32B, crossing an array of electro-optic medium 31. Optical conductivity at each pixels can be controlled by the electric field established by the cross bar array of electrodes. The disclosed nonvolatile display can also be a passive matrix display or an active matrix display, driven by thin film transistor (TFT) circuitry.

In a second embodiment of the present invention nonvolatile electro-optic device, the perovskite medium can be used in electro-optic modulators (such as switches, logic gates or memories).

Electro-optic modulators use electric fields to control the amplitude, phase, and polarization state of an optical beam. Electro-optic modulators can be used in communications systems to transfer information utilizing an optical frequency carrier. Since external modulators do not modulate directly the laser source, they do not cause any degrading effects on laser line width and stability. Examples of modulators include feed back systems to hold the intensity in a laser beam constant, or optical choppers to produce a pulse stream from a continuous laser beam, and stabilizer of the laser beam frequency.

Electro-optic modulators typically utilize bulk configurations and integrated optical configurations. Bulk modulators are made from large piece of electro-optic medium and are typically low insertion losses and high power. Integrated-optic modulators are typical wavelength specific because of the waveguide technology used in fabrication. One of the principal advantages of integrated electro-optic modulators compared to bulk crystals is that lower voltages and powers may be used, and faster modulation rates also may be achieved.

The electro-optic effect is the change in the index of refraction of the material under the application of an external electric field. Certain media are birefringent, meaning the index of refraction depends on the orientation of the medium, and therefore the refractive index is best described by an index ellipsoid.

Figure 4A:
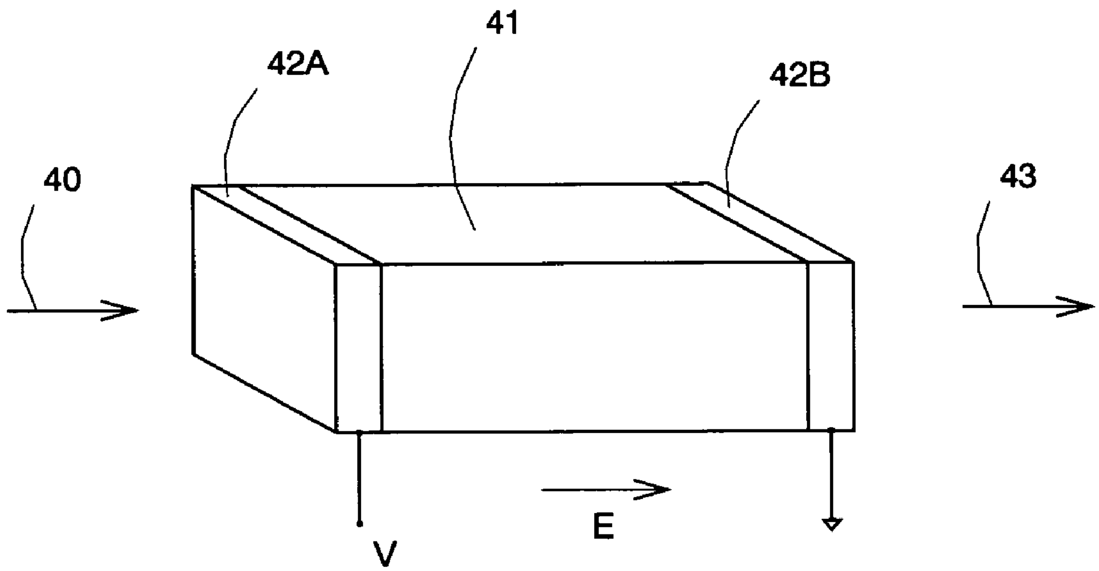
FIG. 4A shows a nonvolatile longitudinal phase modulator according to the present invention.
Figure 4B:
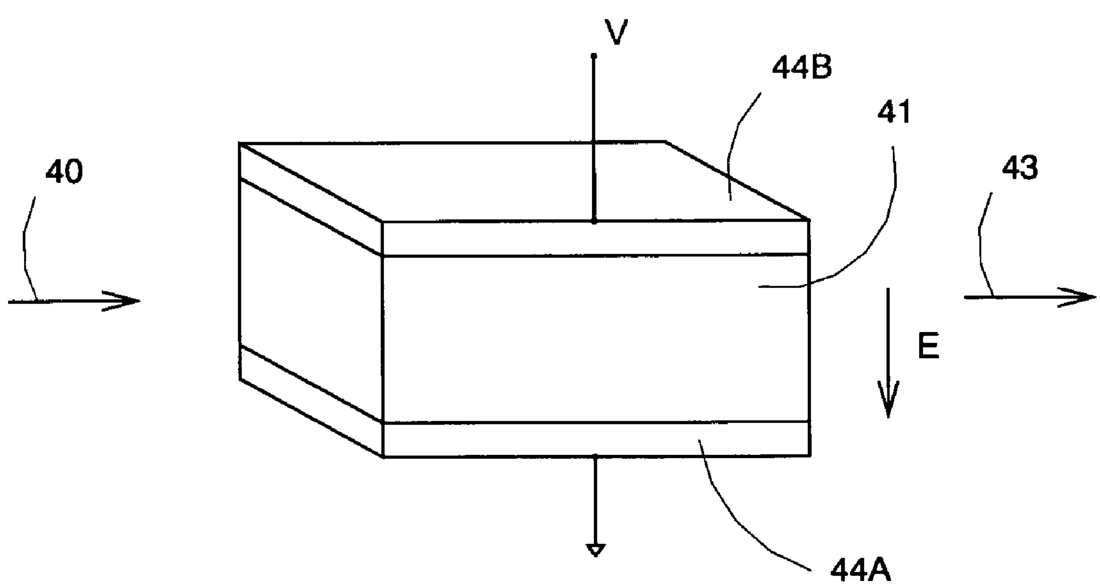
FIG. 4B shows a nonvolatile traverse phase modulator according to the present invention.

The simplest electro-optic modulator is the phase modulator where the light beam experiences an index of refraction change, hence an optical path length change. The phase of the output optical beam therefore depends on the applied electric field. FIG. 4A shows a longitudinal phase modulator comprising a perovskite material as the electro-optic medium 41 sandwiched between 2 electrodes 42A and 42B. An applied voltage V between the electrodes 42 establishes an electric field E parallel to the passage of the light beam 40 to be phase modulated. The beam output 43 is phase shifted from the input light beam 40 by an optical phase shift proportional to the light beam frequency, the length of the modulator, and the applied electric field E. In the longitudinal phase modulation, the electrodes 42 need to be transparent with respect to the light beam 40 to minimize intensity loss. FIG. 4B shows a traverse phase modulator comprising a perovskite material as the electro-optic medium 41 sandwiched between 2 electrodes 44A and 44B. An applied voltage V between the electrodes 44 establishes an electric field E perpendicular to the passage of the light beam 40 to be phase modulated. The beam output 43 is phase shifted from the input light beam 40 by an optical phase shift proportional to the light beam frequency, the length of the modulator, and the applied electric field E. For insulation, optional insulator layers can be inserted between the electrodes and the electro-optic medium.

Figure 5:
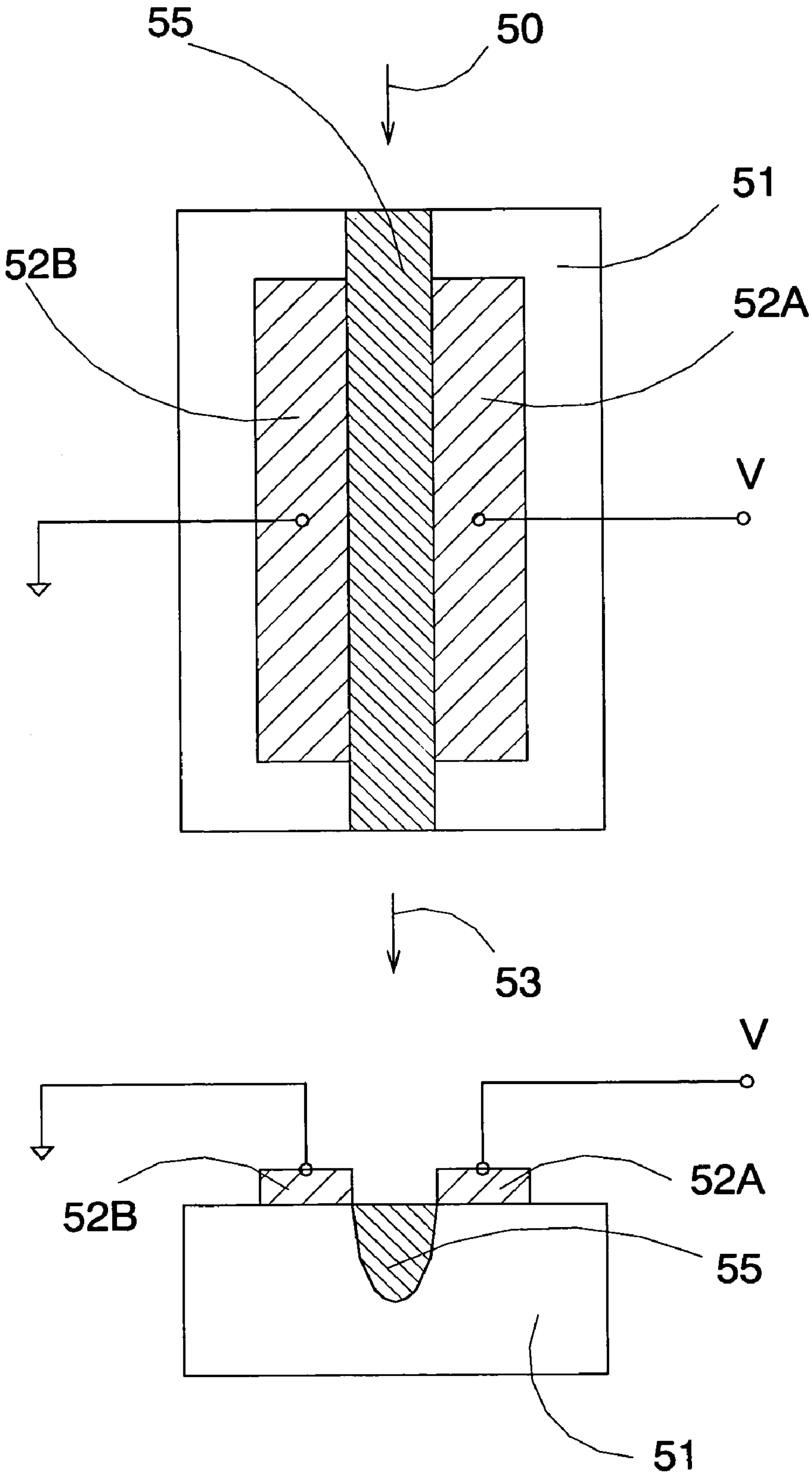
FIG. 5 shows a nonvolatile integrated optic phase modulator according to the present invention.

Like the bulk modulator, the integrated-optic modulator also works on the principle of electro-optic effect. An integrated-optic phase modulator is constructed using a dielectric optical waveguide and the applied electric field to control the index of refraction of the waveguide. FIG. 5 shows an integrated optic phase modulator, comprising a waveguide 51 embedded in a perovskite substrate 55, and a pair of electrodes 52A and 52B. In the presence of an electric field generated by a voltage applied to the electrodes 52, light traveling through this material will experience a change in propagation delay.

Figure 6:
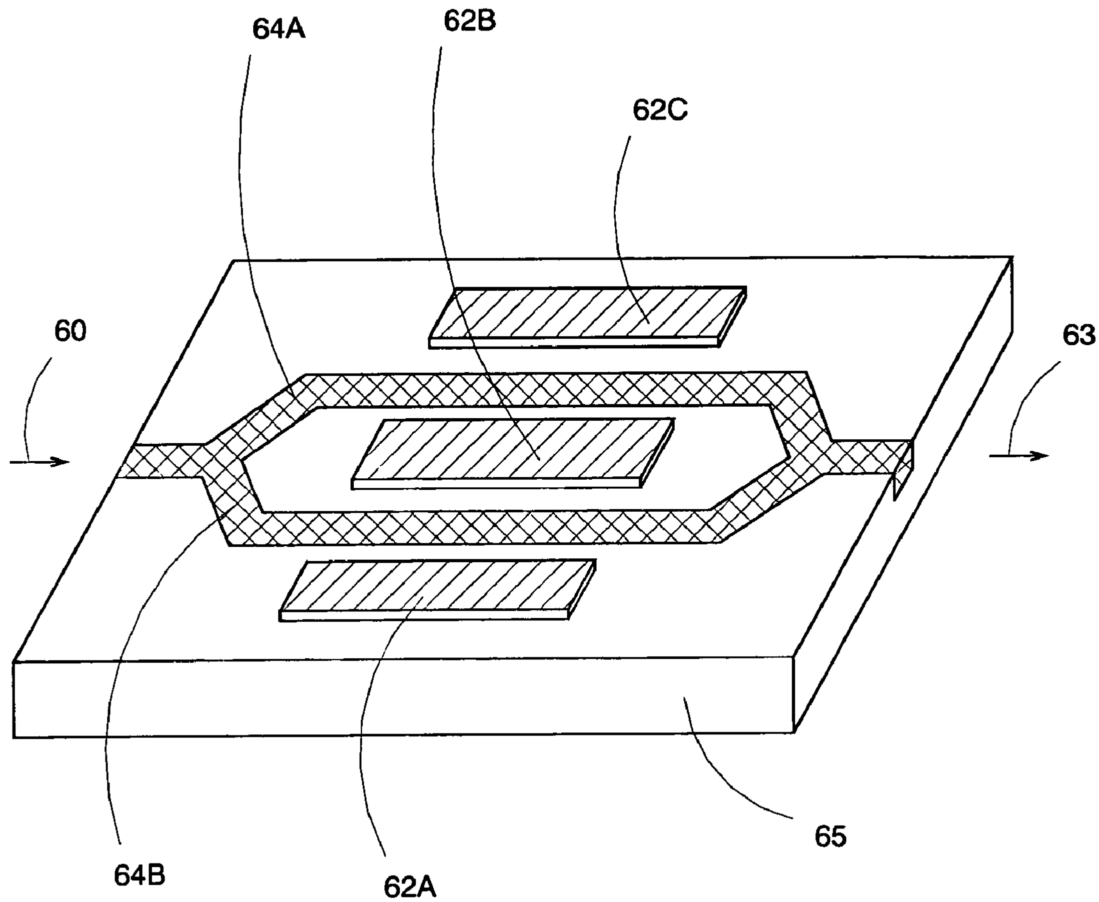
FIG. 6 shows a nonvolatile Mach-Zehnder interferometer according to the present invention.

Typical amplitude modulators are Mach-Zehnder interferometer fabricated on a perovskite substrate as shown in FIG. 6. The optical waveguide is split into two paths 64A and 64B and then recombined. A voltage applied to the center electrode 62B with the other electrodes 62A and 62C grounded generates an electric field with opposite polarity across the two paths of the interferometer. The electric fields change the index of refraction of the two paths of the optical waveguide in opposite directions, increase the relative phase shift in one path, and decrease it in the other path. The input light beam 60 passing through the interferometer experiences constructive or destructive interference due to the phase shift difference in the two pathways, and resulting in an amplitude modulation output light beam 63.

Figure 7:
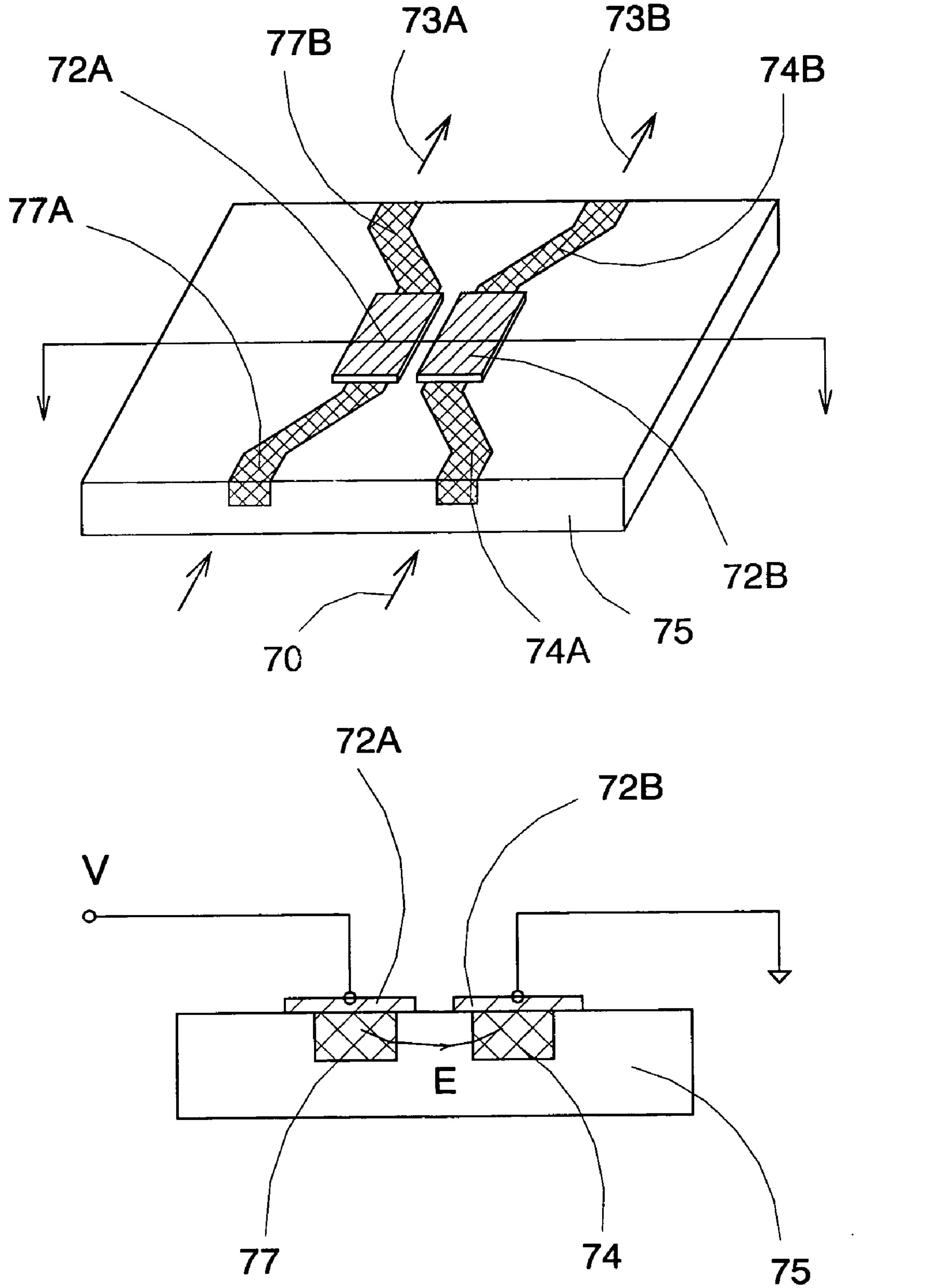
FIG. 7 shows a nonvolatile integrated directional coupler according to the present invention.

FIG. 7 shows an integrated directional coupler, comprising to waveguides 74 and 77 embedded in a perovskite substrate 75. A pair of electrodes 72A and 72B generates an electric field by an applied voltage to alter the refractive index of the two waveguides 74 and 77. Input light beam 70 enters the waveguide branch 74A, and splits into various coupled modes of the waveguide structure. The applied electric field modifies the relative velocities and coupling between the waveguide modes, and generates a variable interference when light is combine at the output.

The directional coupler can also serve as a optical switch, where the input light beam 70 entering the waveguide branch 74A can emerge from the branch 74B to the output 73B if no voltage is applied, and can emerge from the branch 77B to the output 73A in the presence of the electric field.

Figure 8:
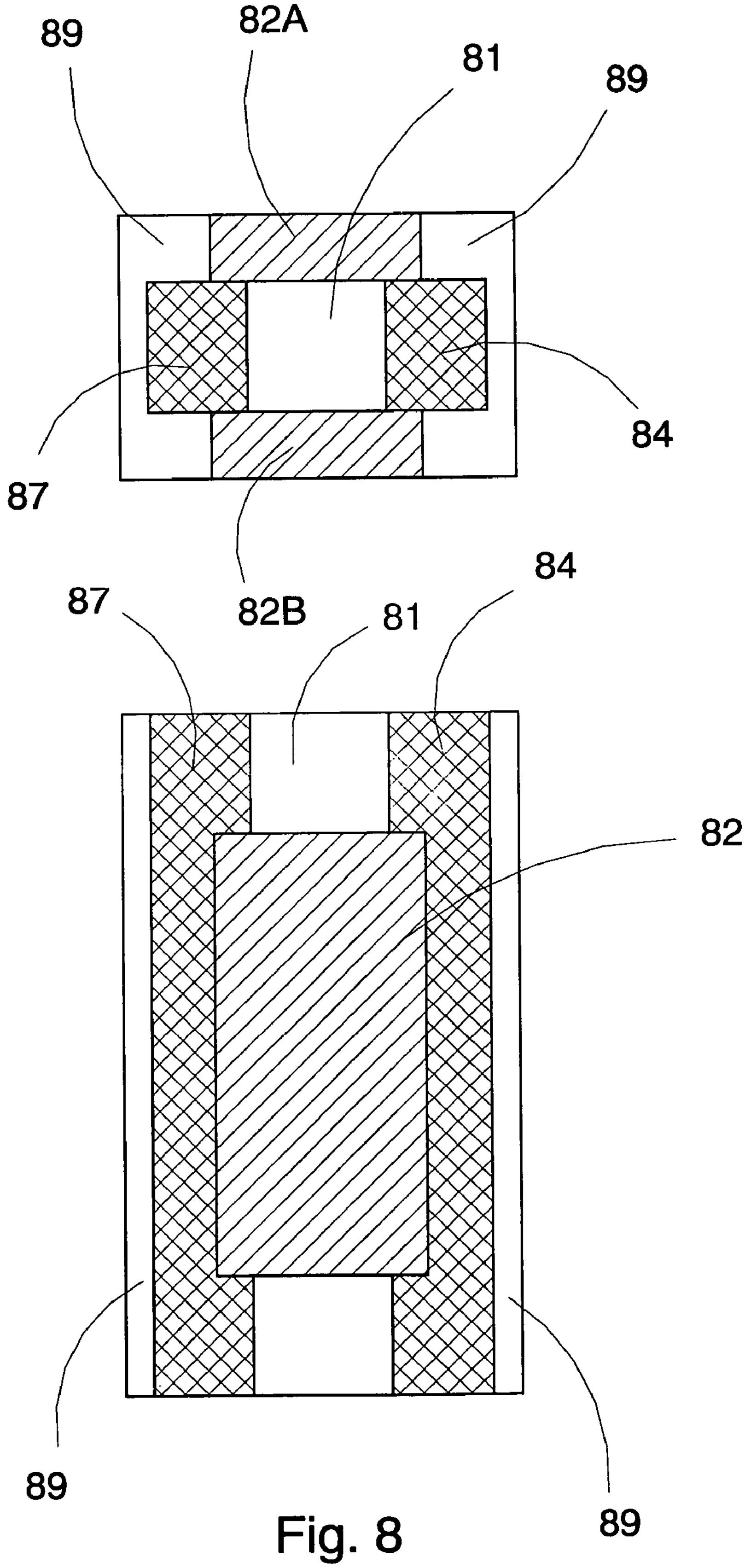
FIG. 8 shows a nonvolatile waveguide switch according to the present invention.

FIG. 8 shows an embodiment of the present invention waveguide switch. The electro-optic medium 81 is a perovskite material constructed with two adjacent waveguides 84 and 87. Two electrodes 82A and 82B sandwich the electro-optic medium 81 to change the index of refraction. Cladding materials 89 cover the waveguides 84 and 87 to reflect the light back into the waveguides. Light enters one waveguide can stay in that waveguide, or can be switched to the adjacent waveguide by the modulation of the electro-optic medium 81.

The electro-optic modulators disclosed are similar in construction to the prior art electro-optic modulator, with the exception of the perovskite medium. By using perovskite material as the electro-optic medium, the disclosed electro-optic modulators are nonvolatile, meaning keeping their optical properties when the electric field is turned off.

Thus a novel nonvolatile electro-optic device and its display and modulator applications have been disclosed by the employment of an electro-optic medium which is a perovskite material having magnetoresistive effect under the influence of an electric field. It will be appreciated that though preferred embodiments of the invention have been disclosed with regard to specific displays and modulators, further variations and modifications thereof may be made within the scope of the invention as defined in the appended claims. Further, although the invention has been described with reference to displays and modulators for use with nonvolatile light propagation applications, other applications of the inventive concepts disclosed herein will also be apparent to those skilled in the art.

What is claimed is:

1. A nonvolatile display comprising:

a plurality of electrodes arranged opposite each other, wherein the electrodes are arranged in the form of cross bar array for applying electric field to selected areas of a nonvolatile solid state electro-optic medium; and the nonvolatile solid state electro-optic medium disposing between the electrodes, wherein the nonvolatile solid state electro-optic medium is a perovskite material having magnetoresistive effect under the influence of an electric field.

2. A nonvolatile display comprising:

a plurality of electrodes arranged opposite each other;

a nonvolatile solid state electro-optic medium disposing between the electrodes, wherein the nonvolatile solid state electro-optic medium is a perovakite material having magnetoresistive effect under the influence of an electric field; and a plurality of polarizer layers sandwiching the nonvolatile solid state electro-optic medium, the polarizer layers polarizing incident light.

3. A nonvolatile solid state electr0-optic modulator comprising a first electrode;

a second electrode offset from the first electrode;

a nonvolatile solid state electro-optic medium disposing in the close proximity of the two electrodes whereby the optical properties of the electro-optic medium can be influenced by the electric field established by the two electrodes; and a plurality of optical waveguides supported in the electro-optic medium;

wherein the nonvolatile solid state electro-optic medium is a perovskite material having magnetoresistive effect under the influence of an electric field.

4. A modulator as in claim 3 further comprising a plurality of insulator layers disposing between the electrodes and the electro-optic medium.

5. A modulator as in claim 3 further comprising a plurality of cladding layer covering the waveguides.

6. A modulator as in claim 3 wherein the optical waveguides are embedded in the electro-optic medium.

7. A modulator as in claim 3 wherein the modulator further comprises a third electrode and functions as an interferometer.

8. A modulator as in claim 3 wherein the modulator comprises one optical waveguide and functions as a phase modulator.

9. A modulator as in claim 3 wherein the modulator comprises two optical waveguide and functions as an amplitude modulator, a directional coupler or a waveguide switch.

10. A modulator as in claim 3 wherein the nonvolatile solid state electro-optic medium is a manganite.

11. A modulator as in claim 3 wherein the nonvolatile solid state electro-optic medium is a manganite having a $Re_{1-x}Ae_xMnO_3$ structure with Re being a rare earth elements and Ae being an alkaline earth elements.

12. A modulator as in claim 3 wherein the nonvolatile solid state electro-optic medium is selected from a group consisting of $PrCaMnO_8$ (PCMO), $LaCaMnO_8$ (LCMO), $LaSrMnO_3$ (LSMO), $LaBaMnO_3$ (LBMO), $LaPbMnO_8$ (LPMO), $NdCaMnO_8$ (NCMO), $NdSrMnO_3$ (NSMO), $NdPbMnO_3$ (NPMO), and $LaPrCaMnO_3$ (LPCMO).

* * * * *